United States Patent

[11] 3,600,915

| [72] | Inventor | Gerhard Corboud<br>Hahnwald, Germany |
|---|---|---|
| [21] | Appl. No. | 861,014 |
| [22] | Filed | Sept. 25, 1969 |
| [45] | Patented | Aug. 24, 1971 |
| [73] | Assignee | Firma Josef Voss KG<br>Bruhl Bezirk Cologne, Germany |
| [32] | Priority | Sept. 28, 1968, Aug. 30, 1969 |
| [33] | | Germany |
| [31] | | P 17 80 563.9 and P 19 44 207.0 |

[54] STEERING SHAFT LOCK EQUIPPED WITH A LOCKING CYLINDER PARTICULARLY FOR AUTOMOTIVE VEHICLES
6 Claims, 14 Drawing Figs.

| [52] | U.S. Cl. | 70/252,<br>70/380 |
|---|---|---|
| [51] | Int. Cl. | B60r 25/02,<br>E05b 65/12 |
| [50] | Field of Search | 70/252,<br>247, 248, 379 R, 379 B, 380, 237, 182–186, 211;<br>180/114 |

[56] References Cited
UNITED STATES PATENTS

| 3,261,187 | 7/1966 | Eichenauer | 70/252 |
|---|---|---|---|
| FOREIGN PATENTS | | | |
| 189,449 | 5/1964 | Sweden | 70/252 |
| 208,489 | 10/1966 | Sweden | 70/252 |
| 1,081,367 | 8/1967 | Great Britain | 70/252 |
| 1,340,826 | 9/1963 | France | 70/252 |

Primary Examiner—Robert J. Wolfe
Attorney—Ernest G. Montague

ABSTRACT: A steering shaft lock equipped with a lock cylinder and an ignition start switch, particularly for automotive vehicles, which comprises a steering column including a steering shaft. A locking latch locks the rotary movement of the steering shaft and a spring urges the locking catch into locking position. A key-operated eccentric has a shaft and the locking latch is withdrawable by the eccentric against the action of the spring and returned into locking position due to the effect of the spring upon release by removal of the key, to lock the locking latch against return pressure. Also a separate locking catch arrests the locking latch against return movement in its locking position and is controllable exclusively by the eccentric into a freeing position.

PATENTED AUG 24 1971 3,600,915
SHEET 1 OF 5
FIG. 1
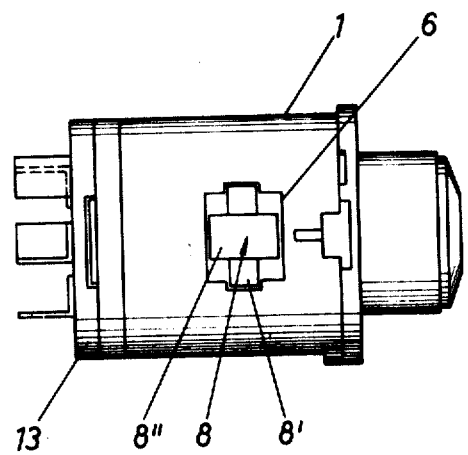
FIG. 2
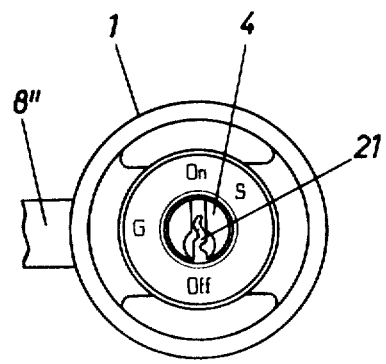
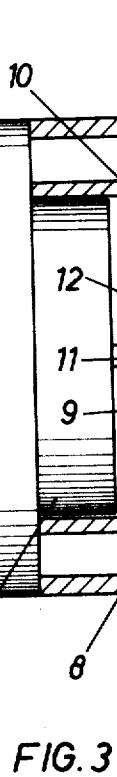
FIG. 3
INVENTOR.
Gerhard Gerland
BY Ernest G. Montague
attorney

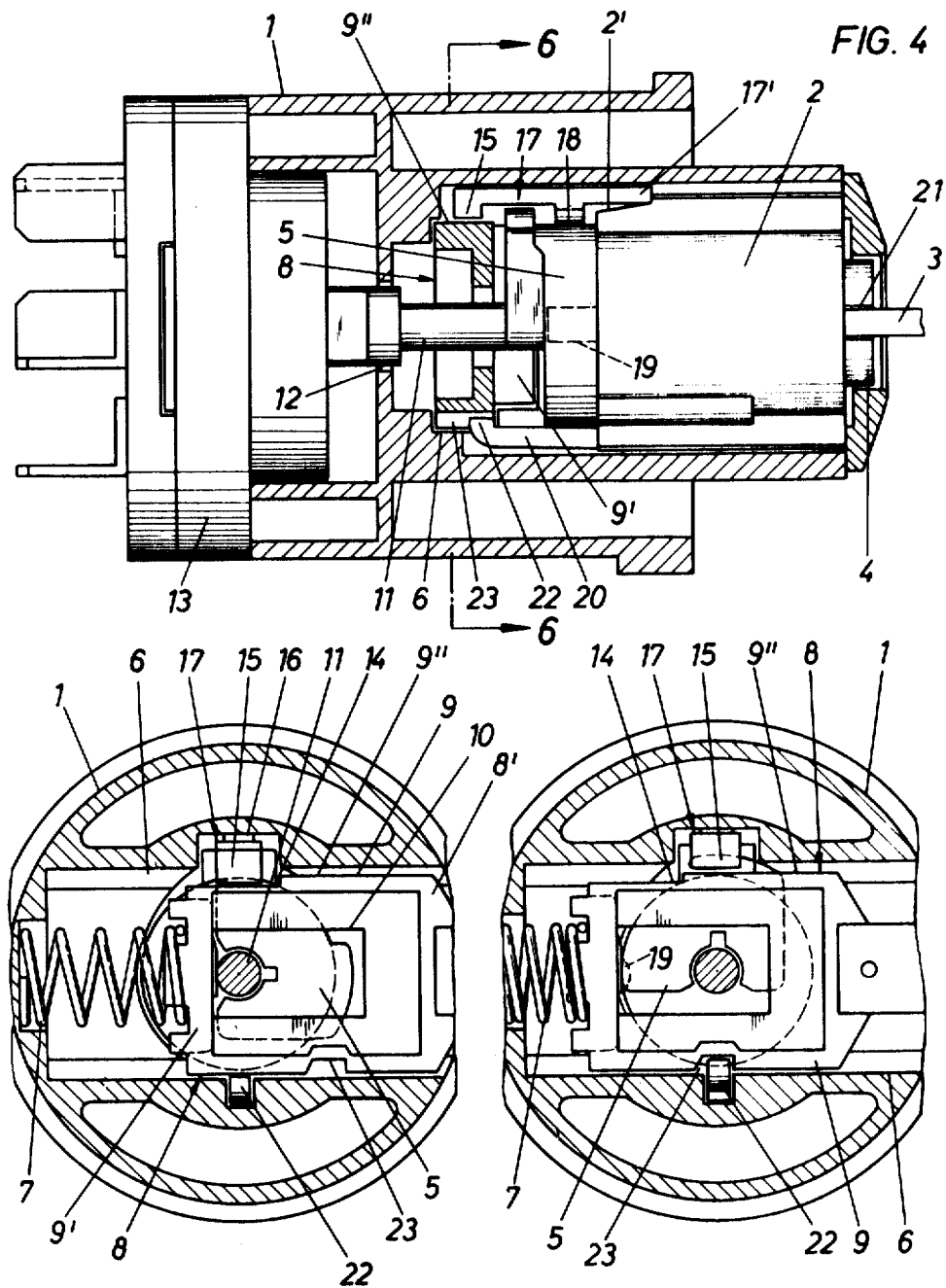

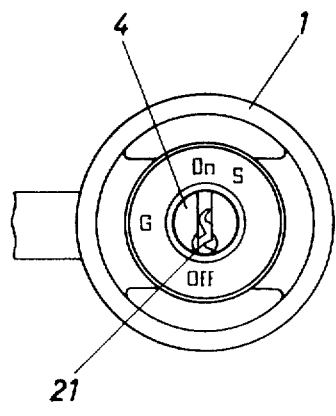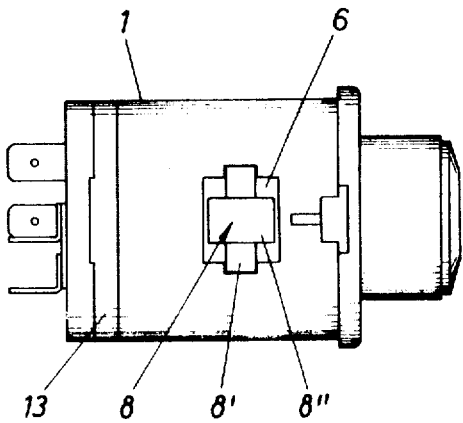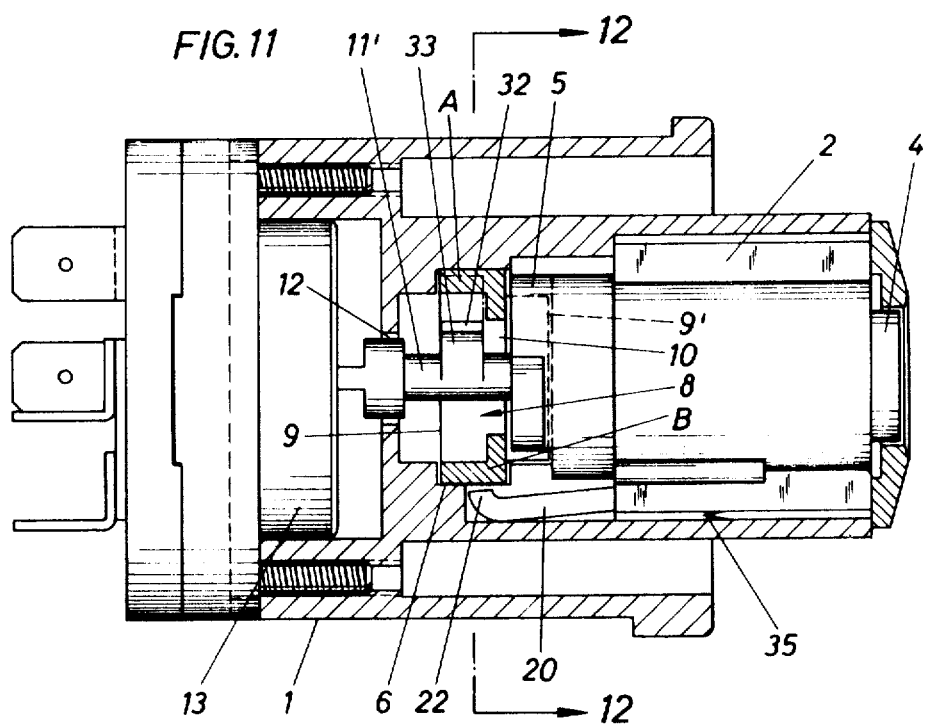

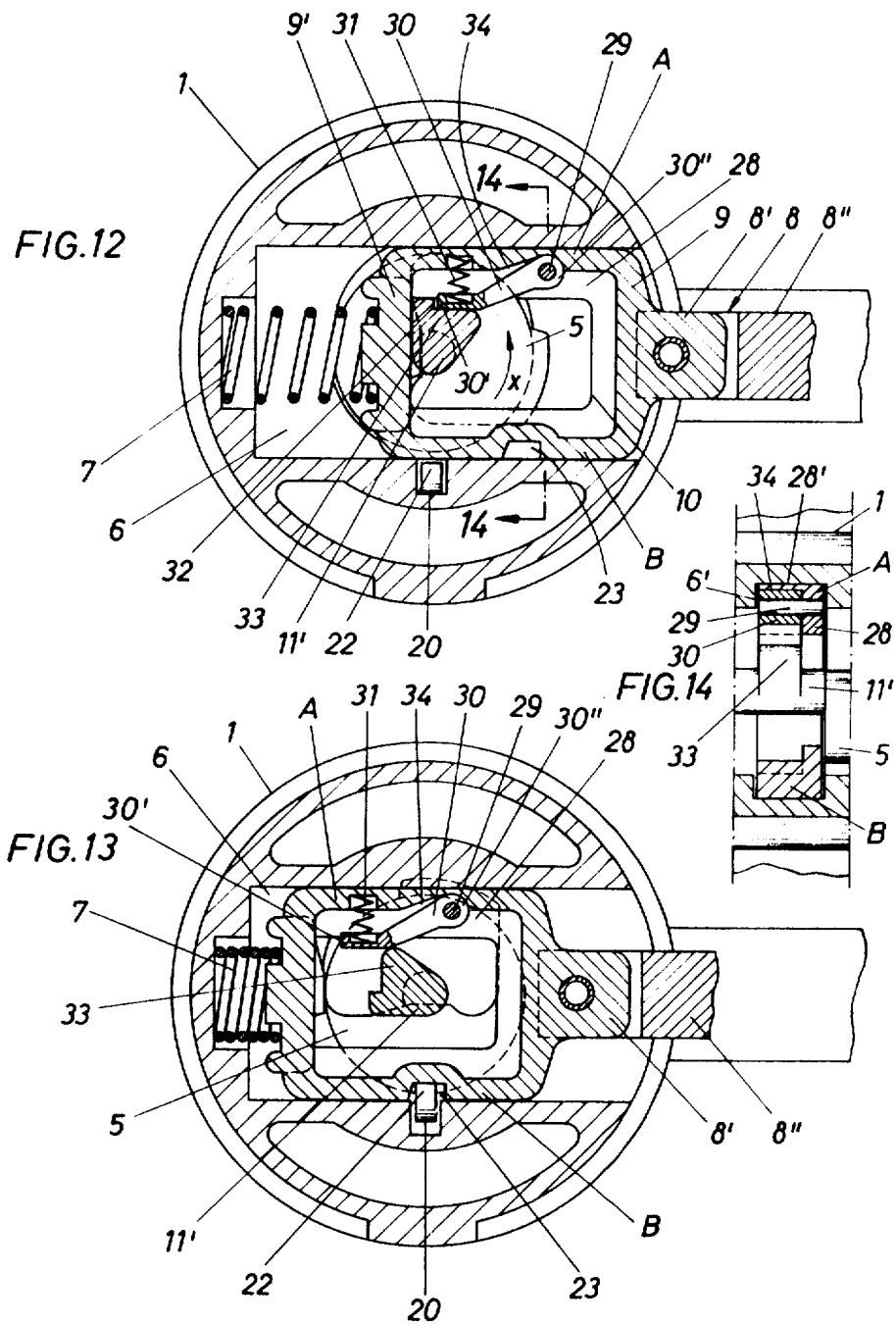

STEERING SHAFT LOCK EQUIPPED WITH A LOCKING CYLINDER PARTICULARLY FOR AUTOMOTIVE VEHICLES

The present invention relates to a steering shaft lock equipped with a locking cylinder and preferably with an ignition starting switch, particularly for automotive vehicles, with a locking latch blocking the rotary movement of the steering column. The locking latch is withdrawable by means of a key-operated eccentric into the freeing position against the force of a spring and which latch enters upon release obtained by the key due to its spring load into the locking position, in which locking position the locking latch is locked against return pushing.

In such designed locks the locking against the return pushing is provided, because it occurs that for the purpose of stealing the housing is opened at a suitable position, in order to move the locking latch backwardly from this position by means of a tool, the locking latch being in locking position under the spring load. In the known structures, the locking of the locking latch against return movement takes place by the same locking member, which retains also the locking latch up to the removal of the key, in the withdrawn position. This requires complicated controls and, thereby, also a structure of the lock which is free from disturbances, and first of all requires special keys, which must be equipped with a special notch for the control of the locking member, which secures the locking latch in the advanced position against return movement which as well must retain the withdrawn position of the locking latch, up to the start of the key removal. For this reason, the previously known solutions of the problem do not permit to choose a structure, in which in an advanced manner the release of the withdrawn locking latch takes place only when the key is completely removed from the lock, which, however, reduces the danger of an accident. The known structures are also not sufficiently safe against theft. One can release, by insertion of an auxiliary tool into the key channel, the locking of the advanced locking latch.

It is, therefore, one object of the present invention to provide a steering shaft lock equipped with a locking cylinder particularly for automotive vehicles, wherein a steering shaft lock of the type described above is designed such, that the locking latch locking the steering column in the holding position, cannot be brought by a tool applied on the outside into the freeing position in the event the key is removed, and in particular such, that this holding of the locking latch takes place in a simple structure, independently from the structure holding the locking latch in the withdrawn position, because the locking latch is always accessible by means of the key.

It is another object of the present invention, to provide a steering shaft lock equipped with a locking cylinder particularly for automotive vehicles, wherein an independent locking spring catch is provided, with arrests the locking member in its locking position against return movement, and which locking spring catch is controllable exclusively by an eccentric in its freeing position.

It is still another object of the present invention to provide a steering shaft lock equipped with a locking cylinder preferably for automotive vehicles, wherein the spring-biased locking spring catch slides with its head on the side of the latch equipped with a locking recess and has a cam at the rear side of the head, which cam engages an eccentric, and which has a recess for receiving the cam.

Beyond that, it is of advantage in accordance with the present invention, that the tail-locking latch is formed in the shape of a frame, the rear frame member of which is controlled by the eccentric, and that the head slides on the one frame side.

A further advantageous embodiment of the present invention is provided according to which the locking catch is mounted in the latch and snaps behind a locking nose of the eccentric, which has a control face for lifting of the spring catch.

It is however favorable thereby, in accordance with the present invention, that the tail of the locking latch is designed in the form of a frame surrounding the eccentric and the locking spring catch is mounted in the one frame arm. Furthermore, an advantageous variation can be found, in accordance with the present invention, in an arrangement, according to which the locking spring catch designed as a locking rachet sits on the inner face of the one arm of the latch tail—frame section designed angularly in cross section and cooperates with an additional eccentric, which sits on the shaft of the eccentric controlling the return movement of the latch.

It is advantageous in accordance with the present invention, that the locking rachet is disposed in the latch tail—frame section, which is disposed opposite the other latch tail—frame section cooperating with the key remover—safety-locking member.

Due to this design, in an advantageous manner, a steering shaft lock is produced, which achieves a high safety against stealing of a vehicle equipped with a lock. One can though, by insertion of an auxiliary tool instead of the fitting key release the locking member retaining the locking latch; nevertheless, the locking latch cannot be displaced.

The separate locking catch arresting the locking catch in its locking position against return movement, causes with high safety, that from the side of the steering shaft locking housing to be broken open, the locking latch cannot be moved backwardly into its freeing position against the force of the spring with an auxiliary tool or the like. In a freeing position, the locking rachet is controlled by the eccentric. The fact, that in this safety means against stealing, already present parts are included, brings about first of all the advantage, that the steering shaft lock is not appreciably more expensive. Also the locking ratchet can be then incorporated into the total structure of the lock. The lock recess can be provided in an advantageous manner on the side of the locking latch, on which the head of the locking ratchet slides. In the rear of this head the locking ratchet has a cam, which is disposed in the holding position of the lock in a recess of the eccentric. The eccentric has thereby a double function. One function resides in an arrangement, according to which it moves the locking latch by a length displacement, while the other function resides in the fact, that it controls also the locking ratchet. It is also constructively advantageous, to design the tail of the locking latch in form of a frame surrounding the eccentric partly or completely. In the latter case the locking ratchet can be provided in the frame arm of the frame surrounding the eccentric. This embodiment is of a simple nature. The locking ratchet snaps behind a locking nose of the eccentric, which has a control face for lifting the ratchet and thereby the eccentric fulfills also in this embodiment, the already-mentioned double function.

In accordance with another solution of the present invention, the locking ratchet is provided in an advantageous manner, while obtaining a stabile structure, likewise in the locking tail. By this arrangement a great safety results, if it is attempted in case of stealing by means of a tool after opening of the steering shaft housing at a suitable position, to move backwardly the locking latch from its locking position into the freeing position. On the steering shaft lock housing no structure change for receiving of the locking ratchet is required. The locking ratchet can be fitted in with a large dimension rather with the use of the free space within the locking tail in the one frame-shaped latch tail—frame section. In this free space, likewise, the eccentric extends cooperating with the free end of the locking ratchet. A pressure spring engages the free end, entering into a lock-recess of the eccentric and prevents the undesirable swinging of the locking ratchet. Only by means of the key belonging to the lock, does the eccentric control the locking latch into a freeing position, whereupon the locking latch can be moved backwardly from its locking position. The mounting of the lock can be performed without any difficulties. The locking ratchet is secured due to the arrangement of the locking ratchet on the inner face of the one arm of the locking tail—frame section formed angularly in cross section, on the one hand, being secured by the one arm and, on the other hand, by a wall of the cross channel in its position, whereby additional safety means, as spring rings or the like, can be omitted or the holding of the locking on the bearing pin. The already-mentioned eccentric cooperating with the locking ratchet is formed as an additional eccentric and sits favorably on the shaft of the eccentric controlling the return movement of the latch. Yet the possibility exists also, to form the additional eccentric and the eccentric abutting on each other, thereby obtaining the correspondingly arranged control steps. Furthermore, structural advantages are brought about, if the locking ratchet is provided in the locking tail—frame section, which is disposed opposite the other frame section and which has the rest opening for entering of the rest tooth of the key removal safety locking member.

With these and other objects in view, which will become apparent in the following detailed description, the present invention will be clearly understood in connection with the accompanying drawings, in which:

FIG. 1 is a side elevation of the steering shaft lock;

FIG. 2 is an end view of the lock disclosed in FIG. 1;

FIG. 3 is an axial section of the steering shaft locking position with the key removed therefrom;

FIG. 4 is a longitudinal section through the steering shaft lock in garage-position with inserted key;

FIG. 5 is a section along the lines 5—5 of FIG. 3;

FIG. 6 is a section along the lines 6—6 of FIG. 4;

FIG. 9 is a side elevation of a third embodiment of the steering shaft lock;

FIG. 10 is a front elevation thereof;

FIG. 11 is a longitudinal section, at an enlarged scale, of the steering shaft lock in locking position and with the key removed;

FIG. 12 is a section along the lines 12—12 of FIG. 11;

FIG. 13 is a section similar to that shown in FIG. 12, however, shown in the so-called garage-position; and FIG. 14 is a section along the lines 14—14 of FIG. 12.

Figure 7:
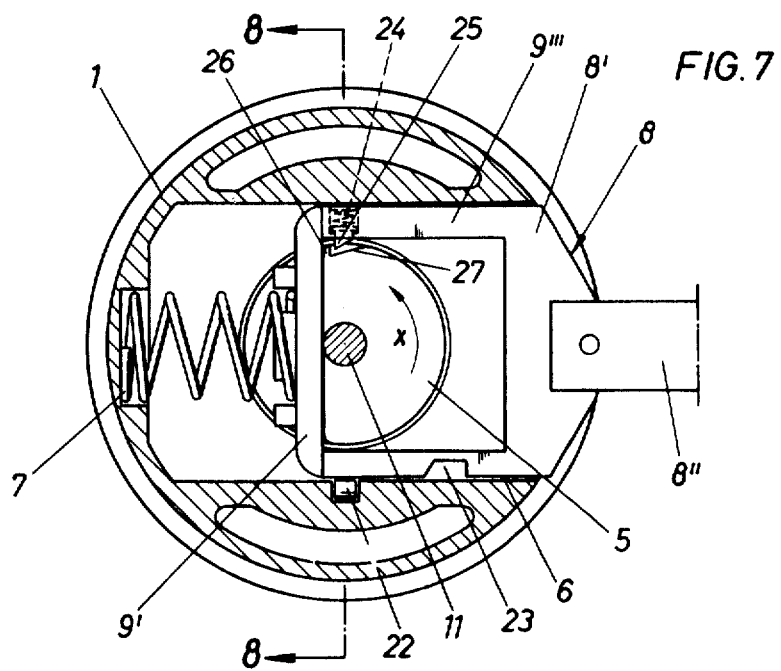
FIG. 7 is a section similar in that shown in FIG. 5, however, disclosing a second embodiment of the present invention.

Referring now to the drawings and particularly to FIGS. 1–6, the steering shaft lock as designed in accordance with the present invention comprises a steering shaft lock housing into which a cylinder lock body 2 is inserted. This cylinder body 2 supports a cylinder core 4 which is rotatable by means of a key 3 into the position "hold-garage-travel-start," to which cylinder core 4 are coordinated tumblers (not shown). The cylinder core 4 is connected by its rear end with an eccentric 5. The latter controls a latch 8 which is under the effect of a spring 7 and is displaceable in a cross channel 6 of the steering shaft lock housing 1.

The latch 8 comprises a frame 9 forming a latch tail 8' and the latch head 8 pivotally connected with the frame 9, which enters in the locking position the steering column. The frame 9 has the passage opening 10 for the driver 11 secured to the eccentric 5, which driver projects through a bore 12 of the steering shaft lock housing and enters the ignition start switch 13, the switching cylinder of which (not shown) is rotated in accordance with closing positions of the cylinder core 4. The frame 9 overlaps with its rear frame arm 9' the eccentric 5. The frame side 9'' disposed angularly thereto is equipped with a locking recess 14. In holding position of the lock the head 15 of a lock ratchet 17 engaged by a blade spring 16. To the rear of this head 15 the lock ratchet 17 has a cam 18, which is disposed on the eccentric 5, which has a recess 19 for the reception of the cam 18. To the end 17' of the lock ratchet 17 disposed opposite the head 15 is coordinated an obliquely rising recess 2' in the lock cylinder housing 2.

In the embodiment described and shown a locking member 20 is provided which enters the locking latch tail 8' and which is releasable by means of a key 3, which locking member 20 is formed as a double-armed lever under the effect of a spring.

The locking member 20 extending over the entire length of the closing cylinder housing 2 enters thereby with its forward end into the key slot 21 of the cylinder core 4. The oppositely disposed end of the locking member 20 has a resting tooth 22, which, if the key is inserted and thereby the front end of the locking member 20 is removed from the key slot 21, upon return closing of the locking latch 8 up to the completed removal of the key into a resting position 23 provided on the locking latch 8.

The lock ratchet operates in the following manner: If the key is removed from the lock disposed in the holding position, the locking member 20 has freed the locking latch 8, which is retained by the spring 7 in locking position. In this position the cam 18 of the locking catch 17 enters the recess 19 of the eccentric 5. By this arrangement the head 15 of the sping-biased locking catch 17 can enter the locking recess 14 of the frame side 9'' (see FIGS. 3 and 5). In case of an attempt of stealing, it is now no more possible, after opening at a suitable position of the housing 1 the locking latch 8 by means of a tool or the like from the locking position into the freeing position.

The locking between the locking catch 17 and the locking latch 8 is lifted, if the key 3 is inserted into the cylinder core 4 and the latter is brought into the other rotary positions. The eccentric 5 connected with the cylinder core 4 join this rotary movement. The cam 18 of the locking ratchet 17 leaves the recess 19 of the eccentric 5 and engages its peripheral face, so that the head 15 of the locking ratchet assumes a position shown in FIGS. 4 and 6.

Figure 8:
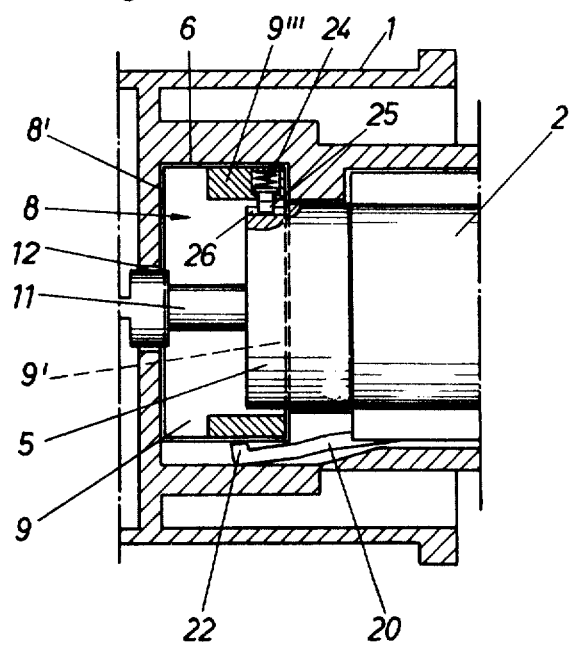
FIG. 8 is a section along the lines 8—8 of FIG. 7.

Referring now again to the drawings and particularly the embodiments which are shown in FIGS. 7 and 8, the locking ratchet 25 under the effect of a spring 24 is disposed in the frame arm 9''' of the frame 9. The tail 8' is formed as a frame 9 surrounding the eccentric 5.

In holding position of the lock the locking ratchet 25 snaps behind a locking nose 26 of the eccentric 5, which has a control face 27 for lifting of the catch. In this position it is likewise not possible, in case of an attempt of stealing, to move the locking catch 8 out of the locking position into the freeing position. Upon key operation of the lock, the eccentric 5 is rotated starting from the position "holding" in the direction of the arrow 4, the latch moves accordingly due to the eccentric 5 into the freeing position and the locking ratchet 25 if lifted by means of the control face 27.

Referring now again to the drawings and in particular to FIGS. 9–14, which disclose a third embodiment of the present invention, the frame 9 has latch tail—frame sections A and B, which are angular in cross section. On the inner face of one arm 28 of the angular locking tail—frame section A is mounted about bearing pin 29 a locking ratchet 30. The latter is formed as one arm lever and the free end 30' enters in the locking position of the locking latch 8 under the effect of the pressure spring 31 a locking recess 32 of an additional eccentric 33 of the shaft 11'.

For the end 30' on the bearing side of the locking ratchet 30, the other arm 28' of the angular latch tail—frame section A has a corresponding recess 34, so that a free-swinging possibility of the locking ratchet 30 is provided. In mounted position the locking ratchet 30 is secured on the one hand, in its position by the arm 28 and, on the other hand, by the wall 6' of the cross channel 6, (see FIG. 14).

The locking ratchet 30 is advantageously disposed in that latch tail—frame section A, which is opposite the lock tail—frame section B equipped with the rest opening 23.

The locking catch 30 operates in the following manner: If the key is removed from the lock disposed in holding position, the locking member 20 has freed the latch 8 for entering into the steering shaft. The latch 8 is retained in this position by the pressure spring 7 (see FIG. 12). The spring-biased locking ratchet 30 enters into the locking recess 32 of the additional eccentric 33. In case of an attempt of stealing, it is also here prevented that for instance after screwing off the ignition start switch 13 or after opening the housing 1 at a suitable position the locking latch 8 can be brought into the freeing position from the outside from the locking position.

Upon the key operation the addition eccentric 33 sitting on the shaft 11' is rotated starting from the position "holding" in direction of the arrow x. The additional eccentric 33 controls thereby the locking ratchet 30 in freeing position, so that the locking latch can be brought into a freeing position by means of the eccentric 5.

While I have disclosed several embodiments of the present invention, it is to be understood that these embodiments are given by example only and not in a limiting sense.

I claim:

1. A steering shaft lock equipped with a lock cylinder and an ignition start switch, particularly for automotive vehicles, comprising
    a steering column including a steering shaft,
    a locking latch locking the rotary movement of said steering shaft,
    a spring urging said locking latch into locking position,
    a key-operated eccentric having a shaft,
    said locking latch being withdrawable by said eccentric against the action of said spring and returned into locking position due to the effect of said spring upon release by removal of the key, to lock said locking latch against return pressure,
    a separate locking catch arresting said locking latch against return movement in its locking position and controllable exclusively by said eccentric into a freeing position,
    said locking catch has a head,
    said locking latch has a side member including a locking recess,
    said locking catch slides with its head on said member of said locking latch and has a cam at the rear end of said head,
    said cam engaging said eccentric, and
    said eccentric has a recess receiving said cam.

2. The steering shaft lock, as set forth in claim 1, wherein said locking latch has a tail member in the form of a frame, the latter including a rear frame base and frame arms,
    said rear frame base is controlled by said eccentric, and
    said head slides on one of said frame arms.

3. A steering shaft lock equipped with a lock cylinder and an ignition start switch, particularly for automotive vehicles, comprising
    a steering column including a steering shaft,
    a locking latch locking the rotary movement of said steering shaft,
    a spring urging said locking latch into locking position,
    a key-operated eccentric having a shaft,
    said locking latch being withdrawable by said eccentric against the action of said spring and returned into locking position due to the effect of said spring upon release by removal of the key, to lock said locking latch against return pressure,
    a separate locking catch arresting said locking latch against return movement in its locking position and controllable exclusively by said eccentric into a freeing position,
    said eccentric has a locking nose,
    said locking catch is mounted in said locking latch and snaps behind said locking nose, and
    said eccentric has a control face for lifting said locking catch.

4. The steering shaft lock, as set forth in claim 2, wherein said frame surrounds said eccentric, and
    said locking latch is mounted in said one of said frame arms.

5. A steering shaft lock equipped with a lock cylinder and an ignition start switch, particularly for automotive vehicles, comprising
    a steering column including a steering shaft,
    a locking latch locking the rotary movement of said steering shaft,
    a spring urging said locking latch into locking position,
    a key-operated eccentric having a shaft,
    said locking latch being withdrawable by said eccentric against the action of said spring and retuned into locking position due to the effect of said spring upon release by removal of the key, to lock said locking latch against return pressure,
    a separate locking catch arresting said locking latch against return movement in its locking position and controllable exclusively by said eccentric into a freeing position,
    a locking latch tail—frame section of angular shape in cross section and a second eccentric cooperating with the former,
    said locking latch is formed as a locking ratchet and sits on the inner face of one arm of said locking latch tail—frame section, and
    said second eccentric sits on said shaft of said eccentric controlling the return movement of said locking latch.

6. The steering shaft lock, as set forth in claim 5, which includes
    a key-removal-safety-locking member, and
    said locking ratchet sits in one of said locking tail—frame sections which is opposite the other of said locking tail—frame sections cooperating with said key-removal-safety-locking member.